(12) United States Patent
Chen et al.

(10) Patent No.: US 11,652,223 B2
(45) Date of Patent: May 16, 2023

(54) ANODE GAS PURGE CONTROL METHOD FOR PROTON EXCHANGE MEMBRANE FUEL CELL

(71) Applicant: ZHEJIANG UNIVERSITY, Hangzhou (CN)

(72) Inventors: Jian Chen, Hangzhou (CN); Zhiyang Liu, Hangzhou (CN); Chizhou Yan, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 236 days.

(21) Appl. No.: 17/312,954

(22) PCT Filed: Jun. 29, 2020

(86) PCT No.: PCT/CN2020/098789
§ 371 (c)(1),
(2) Date: Jun. 11, 2021

(87) PCT Pub. No.: WO2021/164172
PCT Pub. Date: Aug. 26, 2021

(65) Prior Publication Data
US 2022/0200025 A1    Jun. 23, 2022

(30) Foreign Application Priority Data

Feb. 21, 2020  (CN) .......................... 202010109049.6

(51) Int. Cl.
*H01M 8/04223* (2016.01)
*H01M 8/04291* (2016.01)
*H01M 8/0444* (2016.01)

(52) U.S. Cl.
CPC ..... *H01M 8/04231* (2013.01); *H01M 8/0444* (2013.01); *H01M 8/04291* (2013.01)

(58) Field of Classification Search
CPC ......... H01M 8/04231; H01M 8/04291; H01M 8/0444
See application file for complete search history.

(56) References Cited

U.S. PATENT DOCUMENTS

2008/0160353 A1* 7/2008 Savage ............. H01M 8/04179
429/444
2009/0305100 A1* 12/2009 Faye ................. H01M 8/04761
429/411

(Continued)

FOREIGN PATENT DOCUMENTS

DE    102020113105 A1 * 11/2021

OTHER PUBLICATIONS

Machine Translation of DE-102020113105-A1 (Mar. 22, 0223) (Year: 2023).*

*Primary Examiner* — Matthew J Merkling
(74) *Attorney, Agent, or Firm* — Bayramoglu Law Offices LLC

(57) ABSTRACT

An anode gas purge control method for a proton exchange membrane fuel cell is disclosed. An anode water management structure is constructed, and an anode nitrogen concentration observer is used to control the anode water management structure to operate. Liquid water contained in gas of a fuel cell stack is taken out by controlling a hydrogen flow rate through a hydrogen circulating pump and removed through a second water-vapor separator. Liquid water precipitated by gas condensation is removed through a first water-vapor separator. A nitrogen concentration observed value is obtained by using the anode nitrogen concentration observer, a purge duration is obtained by using a purge continuation process model, and when the nitrogen concentration observed value reaches a nitrogen concentration threshold, the purge valve is opened and nitrogen is dis- (Continued)

charged. After the purge duration, the purge valve is closed, and next cycle is entered.

2 Claims, 3 Drawing Sheets

(56) References Cited

U.S. PATENT DOCUMENTS

| | | | | |
|---|---|---|---|---|
| 2015/0280260 A1* | 10/2015 | Lee | ................... | H01M 8/04164 |
| | | | | 429/414 |
| 2016/0164124 A1* | 6/2016 | Suh | ................... | H01M 8/04231 |
| | | | | 429/411 |
| 2016/0240875 A1* | 8/2016 | Rama | ................ | H01M 8/04761 |
| 2017/0179511 A1* | 6/2017 | Jung | ................ | H01M 8/04686 |

* cited by examiner

ANODE GAS PURGE CONTROL METHOD FOR PROTON EXCHANGE MEMBRANE FUEL CELL

CROSS REFERENCE TO THE RELATED APPLICATIONS

This application is the national phase entry of International Application No. PCT/CN2020/098789, filed on Jun. 29, 2020, which is based upon and claims priority to Chinese Patent Application No. 202010109049.6 filed on Feb. 21, 2020, the entire contents of which are incorporated herein by reference.

TECHNICAL FIELD

The present invention belongs to a fuel cell treatment control method in the field of fuel cell applications, and in particular, relates to an anode gas purge control method for a proton exchange membrane fuel cell based on nitrogen concentration online observation.

BACKGROUND

In order to improve the utilization rate of hydrogen of a proton exchange membrane fuel cell system, an anode system operates in a dead-end mode. However, in this operating mode, with the operation of the fuel cell system, cathode nitrogen and liquid water produced may infiltrate the anode by means of transmembrane transport. On the one hand, too much water may cause local degassing of the anode, which may cause a reversal, and on the other hand, too much nitrogen may reduce a hydrogen partial pressure of the anode and affect the overall performance of a stack. Therefore, periodic purge treatment is necessary to remove excess water and hydrogen from the anode.

Currently, a purge trigger manner used in the engine system is time-based, and an anode purge is carried out in a period of time determined under different current output. However, under the technical solution, on one hand, both flooding and nitrogen concentration may be eliminated during calibration, and in many cases, purge may be started for drainage even if the nitrogen concentration is substantially low, resulting in unnecessary waste of hydrogen. On the other hand, when the stack current output changes, it will cause problems such as difficult selection of the purge time.

SUMMARY

In order to solve the problems existing in the prior art, the present invention provides an anode gas purge control method for a proton exchange membrane fuel cell based on nitrogen concentration online observation.

On the premise of effective water management, the present invention can avoid the above problems based on a concentration-triggered anode purge process. During operation of a fuel cell engine, nitrogen concentration in the anode is not directly measured by a sensor, but gas concentration of the anode is estimated in real time by means of a model design observer.

The present invention adopts the following technical solution:

Firstly, constructing an anode water management structure of a proton exchange membrane fuel cell with two water-vapor separators and a hydrogen circulating pump, and decoupling degradation of stack performance caused by flooding and nitrogen concentration accumulation, controlling the anode water management structure to operate by an anode nitrogen concentration observer to realize anode gas purge, and to control anode system gas purge triggered by nitrogen concentration, which greatly improves the utilization rate of hydrogen.

As shown in FIG. 1, the anode water management structure includes a first water-vapor separator located at an inlet of a fuel cell stack, a second water-vapor separator located at an outlet of the fuel cell stack, the hydrogen circulating pump, a hydrogen supply valve, a pressure regulating valve, and a purge valve; an inlet of the hydrogen supply valve is connected to a hydrogen source, an outlet of the hydrogen supply valve is connected to an inlet of the first water-vapor separator via the pressure regulating valve, an outlet of the first water-vapor separator is connected to an anode inlet of the fuel cell stack, an anode outlet of the fuel cell stack is connected to an inlet of the second water-vapor separator, and an outlet of the second water-vapor separator is discharged through the purge valve; the hydrogen circulating pump is connected between the first water-vapor separator and the second water-vapor separator, a pipe between the outlet of the second water-vapor separator and the purge valve is led out and connected to the inlet of the hydrogen circulating pump, and a pipe between the inlet of the first water-vapor separator and the pressure regulating valve is led out and connected to the outlet of the hydrogen circulating pump; a gas produced by the fuel cell stack is driven to bring out by the hydrogen circulating pump and recycled back into the fuel cell stack, liquid water is removed from the gas coming out of the fuel cell stack via the second water-vapor separator, and liquid water precipitated from the gas entering the fuel cell stack is further removed via the first water-vapor separator.

According to requirements of the fuel cell stack, liquid water contained in the gas of the fuel cell stack is taken out by controlling a hydrogen flow rate through the hydrogen circulating pump and removed through the second water-vapor separator, and the liquid water precipitated by gas condensation is removed through the first water-vapor separator.

The hydrogen supply valve controls on-off of hydrogen from a hydrogen storage device. The pressure regulating valve is configured to control the pressure of hydrogen at the anode inlet of the fuel cell stack. The hydrogen circulating pump can make an anode loop form an internal circulation, and a hydrogen metering ratio is obtained based on different stack output to bring out the liquid water produced by the stack, thus avoiding the degradation of the stack performance caused by the accumulation of liquid water, as shown in the upper part of FIG. 1. The second water-vapor separator at an outlet end of the stack is configured to remove liquid water in the gas coming out of the stack. At an inlet end of the stack, liquid water may be precipitated due to the mixing of high-temperature and high-humidity hydrogen and low-temperature hydrogen supplied. In order to avoid the influence on the stack performance due to the entry of the liquid water into the stack, the first water-vapor separator is placed in a front end of the inlet end of the stack to remove condensed liquid water.

Therefore, the anode water management structure, which mainly consists of two water-vapor separators and a hydrogen circulating pump, can effectively decouple the degradation of the stack performance caused by water flooding and nitrogen concentration accumulation.

In the method, a nitrogen concentration observed value is obtained by processing using the anode nitrogen concentration observer, a purge duration is obtained by using a purge continuation process model. When the nitrogen concentration observed value reaches a nitrogen concentration threshold, the purge valve is opened and nitrogen is discharged; after the purge duration, the purge valve is closed, and a next cycle is entered.

Each monolithic cell of the proton exchange membrane fuel cell is connected to a monolithic voltage acquisition plate, and the purge valve is connected to a purge controller. As shown in FIG. 2, the method includes determining an anode working air pressure of the stack and a nitrogen transmembrane penetration rate under this current according to parameter requirements of the stack under different currents, and establishing the purge continuation process model to determine a purge duration t according to the anode working air pressure of the stack; establishing the nitrogen concentration observer according to the nitrogen transmembrane penetration rate, and the nitrogen concentration observer feeds a difference between an estimated value of monolithic voltage attenuation calculated by a stack voltage model and an average monolithic cell voltage attenuation acquired by a monolithic voltage acquisition plate as an observation error feedback of the observer, which serves as the nitrogen concentration observed value; and based on the anode nitrogen concentration observer, when the nitrogen concentration observed value reaches a preset nitrogen concentration threshold, the purge valve is opened through the purge controller and keeps the purge duration t before closing.

The purge continuation process model refers to a model of a gas pressure in the anode and a nitrogen concentration in the gas during the anode gas purge established according to a dynamic equation of an ideal gas and a material conservation equation.

The stack voltage model refers to a model equation of a relationship between an anode hydrogen concentration and a stack voltage established according to a Nernst equation:

$$V_{avgcell} = E_0 + b_0 \left( \ln \frac{P_{an} - P_{N_2,an}}{P_0} + \frac{1}{2} \ln \frac{P_{c,O_2}}{P_0} \right) - v_{ohm} - v_{act} - a_{con}$$

wherein, $V_{avgcell}$ denotes a monolithic cell voltage, $E_0$ denotes a reversible voltage in an ideal state, $b_0$ denotes a parameter related to a gas pressure, $P_{an}$ denotes an anode pressure, $P_{N_2,an}$ denotes an anode nitrogen partial pressure, $P_{c,O_2}$ denotes a cathode oxygen partial pressure, $P_0$ denotes atmospheric pressure, $v_{ohm}$ denotes an ohmic loss voltage, $v_{act}$ denotes a polarization loss voltage, and $v_{con}$ denotes a concentration loss voltage.

According to the above method, the anode gas purge process is divided into two parts: a purge waiting cycle and a purge execution cycle.

The purge waiting cycle refers to a period of time in which the purge valve changes from an on state to an off state until the nitrogen concentration observed value reaches a nitrogen concentration threshold. In the purge waiting cycle, a purge control valve at the anode outlet is closed, an anode cavity is in a closed state, nitrogen continues to accumulate at the anode, and the concentration gradually increases.

The purge execution cycle refers to a period of time from when the nitrogen concentration observed value reaches the nitrogen concentration threshold and the purge valve is opened to the time when the purge valve is closed after the purge duration. In the purge execution cycle, a purge solenoid valve at the anode outlet is opened, and nitrogen in the anode cavity is discharged.

After the purge execution cycle of the anode is completed, the purge valve at the anode outlet is closed, and the whole system enters the next purge waiting cycle.

The present invention has the following advantages:

Based on the specially designed anode water management structure, the method provided in the present invention can effectively decouple the degradation of the stack performance caused by water flooding and nitrogen concentration accumulation.

In the present invention, the online nitrogen concentration observer is used to determine the purge waiting cycle, so that the load can be changed several times in one purge cycle, and the purge duration can be accurately controlled, which reduces the waste of hydrogen during the purge process.

Therefore, the technical solution provided in the present invention can greatly extend the purge time interval and reduce the number of purge under constraint conditions of ensuring the durability and service life of the stack, solves the problem of optimization of a gas purge process of an anode loop of a proton exchange membrane fuel cell engine system, and can greatly improve the utilization rate of hydrogen in a fuel cell system on the basis of ensuring the service life of the stack, so as to improve the overall utilization rate of hydrogen.

DETAILED DESCRIPTION OF THE EMBODIMENTS

The present invention is described in detail below with reference to the accompanying drawings and specific embodiments.

Figure 1:
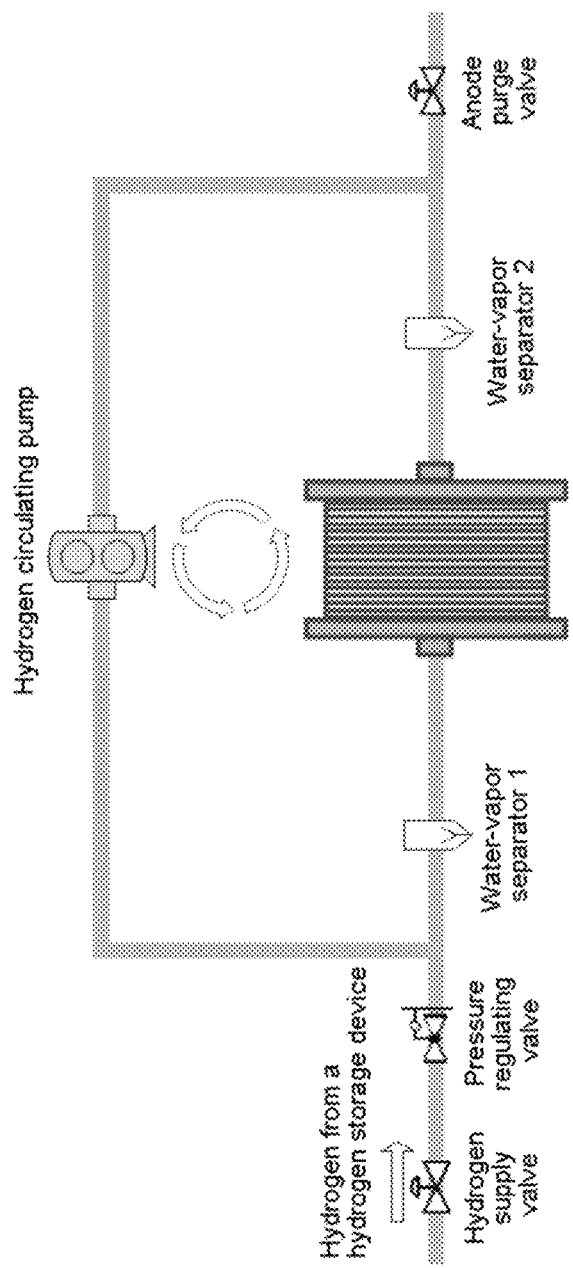
FIG. 1 is a schematic structural diagram showing an anode water management structure according to the present invention.
Figure 2:
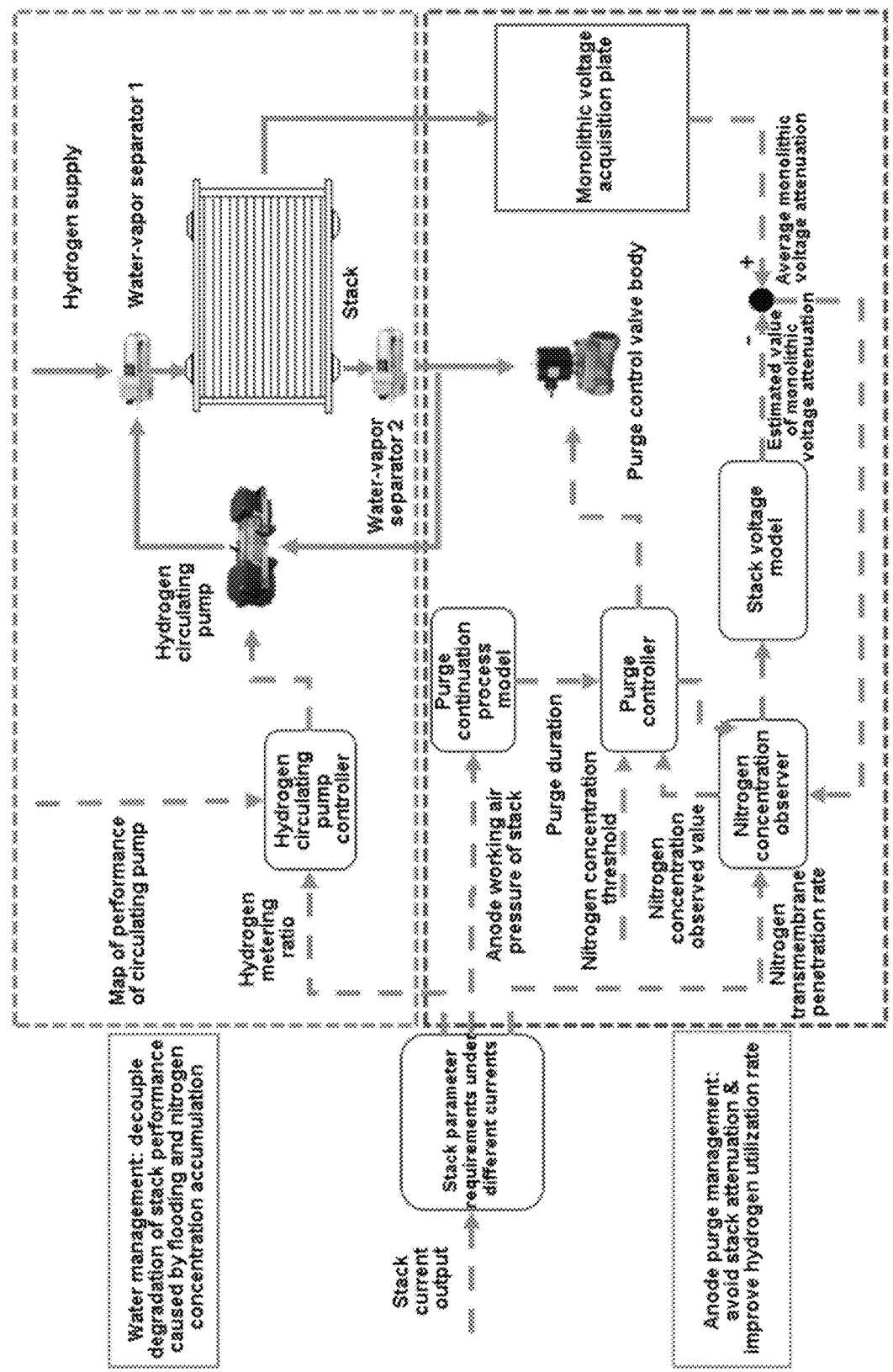
FIG. 2 is a schematic diagram showing an anode purge control process according to the present invention.

An experimental platform is built according to the schematic structural diagram shown in FIG. 1. The anode purge process described in summary is realized in a program of an experimental bench.

An embodiment of complete implementation of the method described in summary of the present invention is as follows.

A 3-kW proton exchange membrane fuel cell stack is used in this embodiment.

During the experiment, a constant metering ratio of 2.5 is set for the cathode, the oxygen content in the test environment is 21%, the anode pressure and the cathode pressure are set according to reference values of a stack manufacturer, a stack coolant inlet temperature is controlled at 60° C.±0.5° C., and a stack coolant outlet temperature is controlled at 65° C.±0.5° C.

Figure 3:
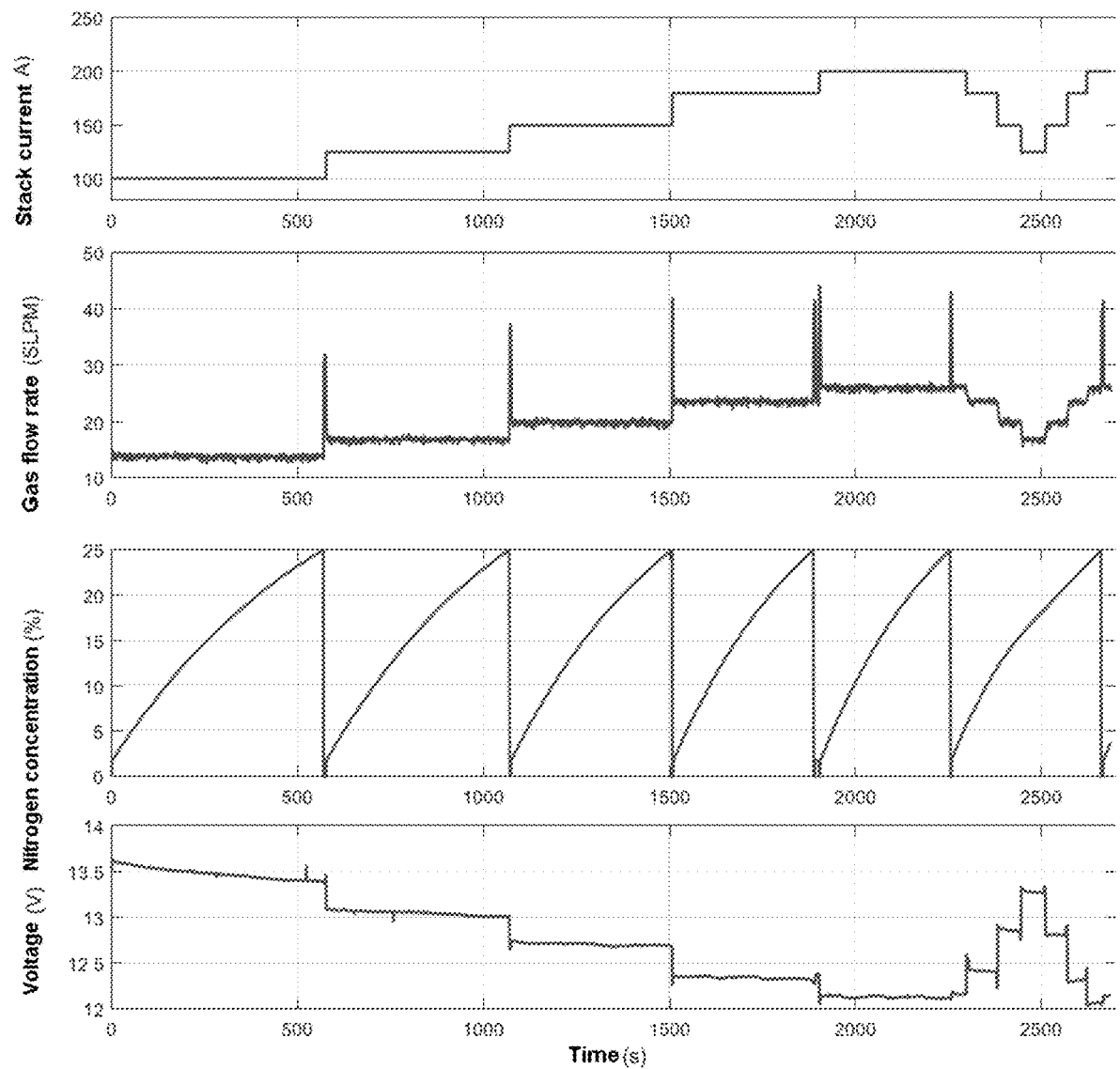
FIG. 3 is a diagram showing variation of gas concentration and a hydrogen flow rate during purge in a drive cycle according to an embodiment of the present invention.

Implementation results of the embodiment are as shown in FIG. 3. Operating conditions of the system after the use of the present invention in a drive cycle are tested under two conditions of maintaining the current constant in one cycle and dynamically changing the stack current output, respectively. In the embodiment, the nitrogen concentration threshold value is set to 25%. FIG. 3 shows the operating conditions of the system under the implementation method described in the present invention. In addition to completing periodic purge under constant current output, this method can also deal with a working condition that the current changes several times in one purge cycle under a condition of using nitrogen concentration as a trigger threshold of purge.

To further verify the superiority of this method, the utilization rate of hydrogen $\eta_{H_2}$ is defined as a ratio of the hydrogen involved in an electrochemical generation reaction ($m_{reaction}$) to a total amount of hydrogen consumed during the operation of the stack. The total amount of hydrogen consumed includes hydrogen involved in the electrochemical reaction, hydrogen discharged during the purge ($m_{purge}$) and hydrogen diffused through a membrane electrode to a cathode ($m_{cross}$):

$$\eta_{H_2} = \frac{m_{reaction}}{m_{reaction} + m_{purge} + m_{cross}}$$

Based on the above formula, the utilization rate of hydrogen is calculated to exceed 99% in the implementation process of the system of the present invention, far exceeding the data in the existing literature.

What is claimed is:

1. An anode gas purge control method for the proton exchange membrane fuel cell comprising: firstly, constructing an anode water management structure of the proton exchange membrane fuel cell with two water-vapor separators and a hydrogen circulating pump, and controlling the anode water management structure to operate by an anode nitrogen concentration observer to realize an anode gas purge, wherein the anode water management structure comprises a first water-vapor separator located at an inlet of a fuel cell stack, a second water-vapor separator located at an outlet of the fuel cell stack, the hydrogen circulating pump, a hydrogen supply valve, a pressure regulating valve, and a purge valve; wherein an inlet of the hydrogen supply valve is connected to a hydrogen source, an outlet of the hydrogen supply valve is connected to an inlet of the first water-vapor separator via the pressure regulating valve, an outlet of the first water-vapor separator is connected to an anode inlet of the fuel cell stack, an anode outlet of the fuel cell stack is connected to an inlet of the second water-vapor separator, and an outlet of the second water-vapor separator is discharged through the purge valve; the hydrogen circulating pump is connected between the first water-vapor separator and the second water-vapor separator, a first pipe between the outlet of the second water-vapor separator and the purge valve is led out and connected to an inlet of the hydrogen circulating pump, and a second pipe between the inlet of the first water-vapor separator and the pressure regulating valve is led out and connected to an outlet of the hydrogen circulating pump; a first gas produced by the fuel cell stack is driven to bring out by the hydrogen circulating pump and recycled back into the fuel cell stack, first liquid water is removed from the first gas coming out of the fuel cell stack via the second water-vapor separator, and second liquid water precipitated from a second gas entering the fuel cell stack is further removed via the first water-vapor separator.

2. An anode gas purge control method for the proton exchange membrane fuel cell comprising: firstly, constructing an anode water management structure of the proton exchange membrane fuel cell with two water-vapor separators and a hydrogen circulating pump, and controlling the anode water management structure to operate by an anode nitrogen concentration observer to realize an anode gas purge, then obtaining a nitrogen concentration observed value by processing using the anode nitrogen concentration observer, and obtaining a purge duration by using a purge continuation process model, wherein when the nitrogen concentration observed value reaches a predetermined nitrogen concentration threshold, the purge valve is opened and nitrogen is discharged; after the purge duration, the purge valve is closed, and a next cycle is entered, wherein each monolithic cell of the proton exchange membrane fuel cell is connected to a monolithic voltage acquisition plate, and the purge valve is connected to a purge controller; the anode gas purge control method further comprises: determining an anode working air pressure of the fuel cell stack and a nitrogen transmembrane penetration rate under a predetermined current according to parameter requirements of the fuel cell stack under different currents, and establishing the purge continuation process model to determine the purge duration t according to the anode working air pressure of the fuel cell stack; establishing the anode nitrogen concentration observer according to the nitrogen transmembrane penetration rate, wherein the anode nitrogen concentration observer feeds a difference between an estimated value of monolithic voltage attenuation calculated by a stack voltage model and an average monolithic cell voltage attenuation acquired by the monolithic voltage acquisition plate as an observation error feedback of the anode nitrogen concentration observer, and further serves as the nitrogen concentration observed value; and when the nitrogen concentration observed value reaches the predetermined nitrogen concentration threshold, the purge valve is opened through the purge controller and keeps the purge duration t before closing.

* * * * *